(12) United States Patent
Taniguchi et al.

(10) Patent No.: US 11,889,416 B2
(45) Date of Patent: Jan. 30, 2024

(54) MESSAGE INDICATING A PASS-THROUGH MODE IN WHICH DATA IS RELAYED BETWEEN A TERMINAL DEVICE AND A NETWORK WITHOUT BEING SUBJECTED TO A CONVERSION PROCESS

(71) Applicants: KABUSHIKI KAISHA TOSHIBA, Tokyo (JP); Toshiba Infrastructure Systems & Solutions Corporation, Kawasaki (JP)

(72) Inventors: Keita Taniguchi, Kawasaki (JP); Issei Hatanaka, Kawasaki (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 413 days.

(21) Appl. No.: 17/199,796

(22) Filed: Mar. 12, 2021

(65) Prior Publication Data

US 2021/0204211 A1  Jul. 1, 2021

Related U.S. Application Data

(63) Continuation of application No. PCT/JP2019/035961, filed on Sep. 12, 2019.

(30) Foreign Application Priority Data

Sep. 14, 2018  (JP) .................................. 2018-173033

(51) Int. Cl.
*H04W 52/02* (2009.01)
*G16Y 20/30* (2020.01)
*H04L 9/32* (2006.01)

(52) U.S. Cl.
CPC .......... *H04W 52/0216* (2013.01); *G16Y 20/30* (2020.01); *H04L 9/3263* (2013.01); *H04W 52/0225* (2013.01)

(58) Field of Classification Search
CPC .......... H04W 52/0216; H04W 52/0225; H04W 52/02; H04W 52/00; H04W 52/0219;
(Continued)

(56) References Cited

U.S. PATENT DOCUMENTS 6,941,479 B1    9/2005   Sugiura
7,584,508 B1 *  9/2009   Kashchenko et al. .......... 726/25
(Continued)

FOREIGN PATENT DOCUMENTS

CN    108140278 A    6/2018
EP     2902934 A1    8/2015
(Continued)

OTHER PUBLICATIONS

Nakao Toshio: Data Distribution Method, Information Processor, and Information Processing Method and Program; JP 2004005256 A (Year: 2004).*

(Continued)

*Primary Examiner* — Meless N Zewdu
(74) *Attorney, Agent, or Firm* — Maier & Maier, PLLC

(57) ABSTRACT

According to an embodiment, an information processing apparatus comprises a device interface, a network interface, a power supply part, a battery and a control part. A power supply part is configured to supply electric power from an external power supply. A control part is configured to: perform a conversion process on data from a terminal device, and transmit the data to a network; and when the power supply from the power supply part is stopped, transmit, to another information processing apparatus through the network interface, a first message indicating that a pass-
(Continued)

through mode in which data is relayed between the terminal device and the network without being subjected to the conversion process is set, and set the pass-through mode.

10 Claims, 7 Drawing Sheets

(58) Field of Classification Search
CPC . H04W 52/0235; H04W 92/00; H04W 92/02; H04W 92/04; H04W 92/08; H04W 92/10; H04W 4/18; H04W 52/0261; H04W 52/383; H04W 52/0209; H04W 28/0221; H04W 4/203; H04W 4/30; H04W 88/02; H04L 9/3263; H04L 9/32; H04L 61/301; G16Y 20/30; G16Y 20/20; G16Y 20/40; G16Y 40/00; G16Y 40/50; G16Y 40/30; G16Y 20/00; G16Y 40/10; G16Y 30/00; G16Y 30/10; G16Y 40/35; Y02D 10/00; G06F 1/3212; G06F 1/30; G06F 1/3203; G06F 1/3215; G06F 1/3246; G06F 1/3234; G06F 1/32; G06F 1/3206
See application file for complete search history.

(56) References Cited

U.S. PATENT DOCUMENTS

| | | | | |
|---|---|---|---|---|
| 7,629,958 | B1* | 12/2009 | Nicolet et al. | 345/156 |
| 2002/0169990 | A1 | 11/2002 | Sherburne, Jr. | |
| 2010/0180139 | A1 | 7/2010 | Denney et al. | |
| 2010/0235639 | A1* | 9/2010 | Inoue | 713/168 |
| 2010/0332662 | A1 | 12/2010 | Meylemans et al. | |
| 2011/0072290 | A1 | 3/2011 | Davis et al. | |
| 2012/0257247 | A1 | 10/2012 | Yamasaki | |
| 2013/0054396 | A1* | 2/2013 | Goldfinger et al. | 705/21 |
| 2016/0197982 | A1* | 7/2016 | Reber | H04L 67/10 |
| 2020/0204549 | A1 | 6/2020 | Tomoeda et al. | |

FOREIGN PATENT DOCUMENTS

| | | |
|---|---|---|
| EP | 2963854 A1 | 1/2016 |
| GB | 2446658 A | 8/2008 |
| JP | 2002-543707 A | 12/2002 |
| JP | 2008-68548 A | 3/2008 |
| JP | 2008-187411 A | 8/2008 |
| JP | 2009-117887 A | 5/2009 |
| JP | 2013-21598 A | 1/2013 |
| JP | 2017-22579 A | 1/2017 |
| JP | 2019-50485 A | 3/2019 |
| KR | 10-2017-0110975 A | 10/2017 |
| WO | WO 00/67471 A1 | 11/2000 |

OTHER PUBLICATIONS

Singh et al.: Low Battery Indication in Wi-Fi Enabled Device or Sensor; EP 3291613 A1 (Year: 2018).*
Ren et al.: Method for Controlling Domestic Energy-saving System, Home Base Station and Network Element; CN 102378324 A (Year: 2012).*
Sugasawa Masaji: Power Controller and Power Control Method; JP 2005316593 A (Year: 2005).*
Harada Takanori: Power Supply System, Method for Setting Identification Information of Power Supply System, and Battery Unit; WO 2012157475 A1 (Year: 2012).*
International Search Report dated Oct. 29, 2019 in PCT/JP2019/035061 filed Sep. 12, 2019, 1 page.
Search Report dated Aug. 2, 2022, in corresponding European Application No. 19859096.0; 20 pages.
European Search Report dated Apr. 14, 2022, in corresponding European Patent Application No. 19859096.0, 18 pages.
Office Action dated Aug. 10, 2022, in corresponding Singapore Application No. 11202102542Q; 12 pages.

* cited by examiner

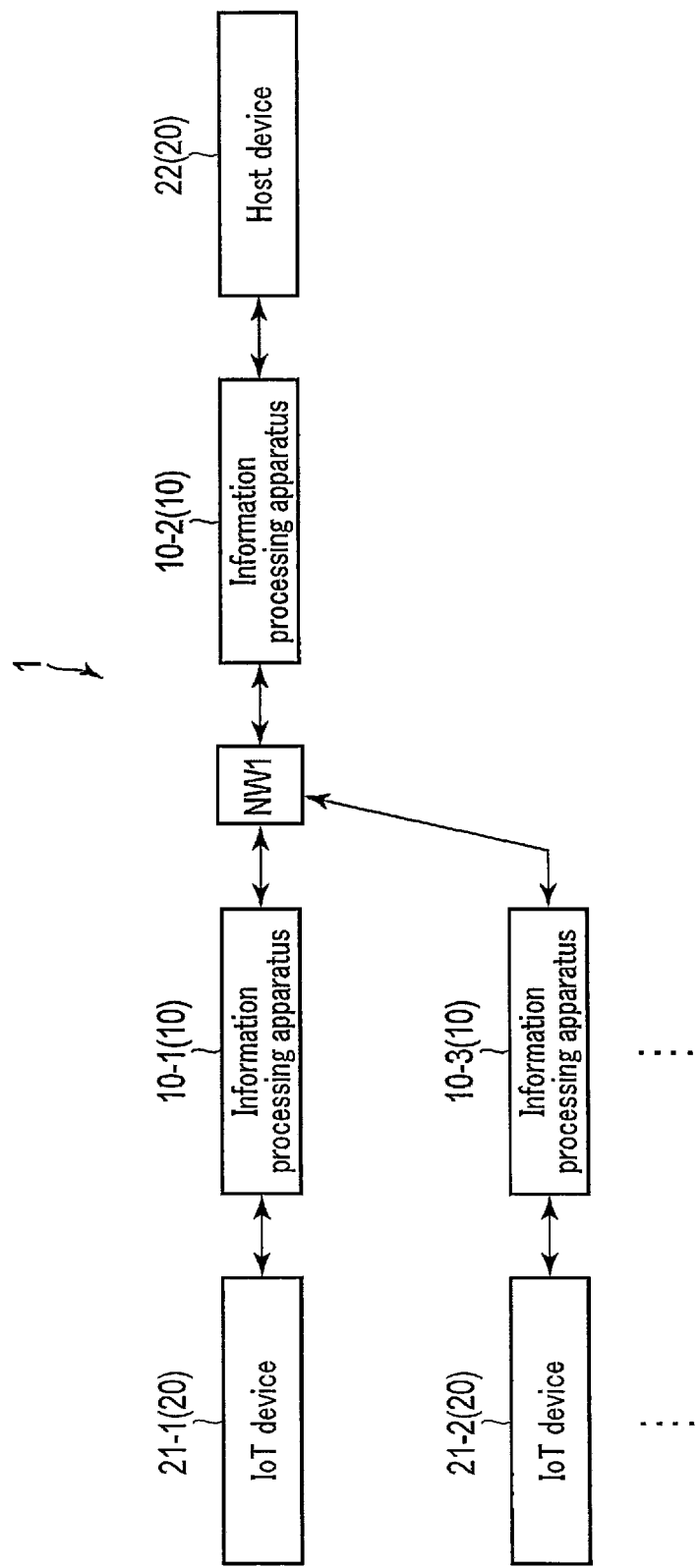
F I G. 1

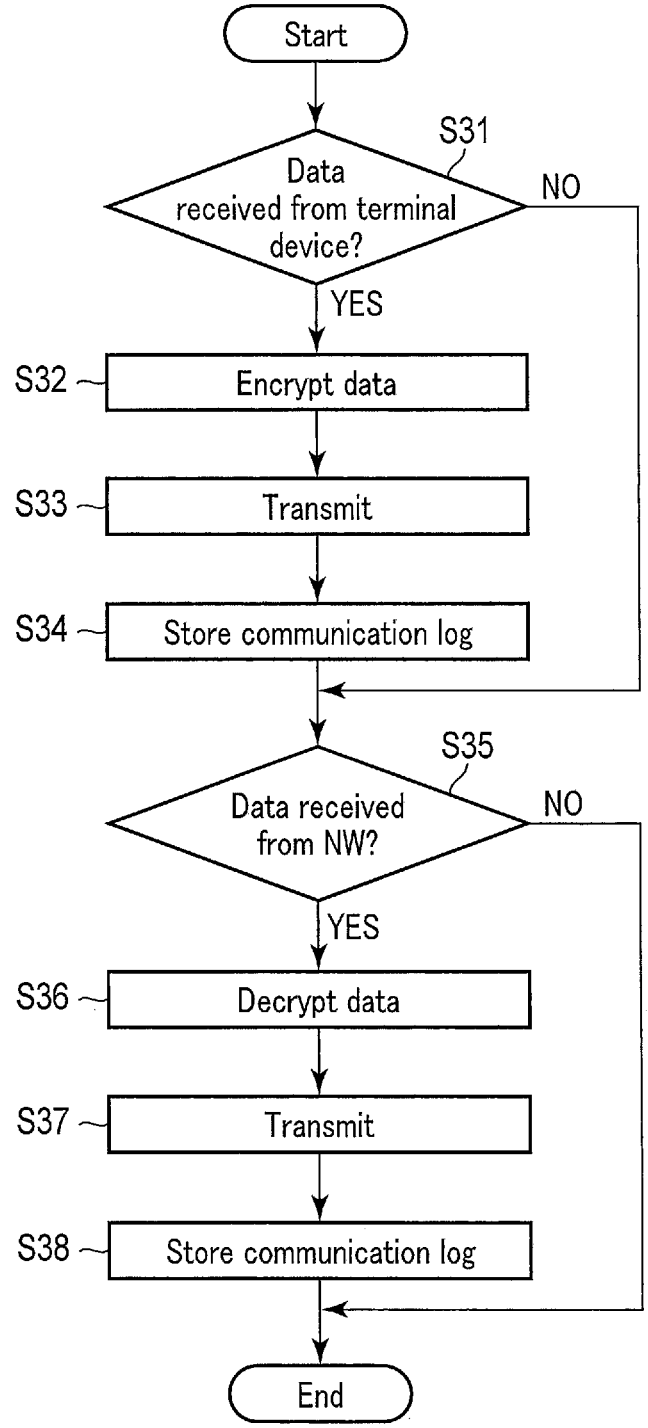
F I G. 5

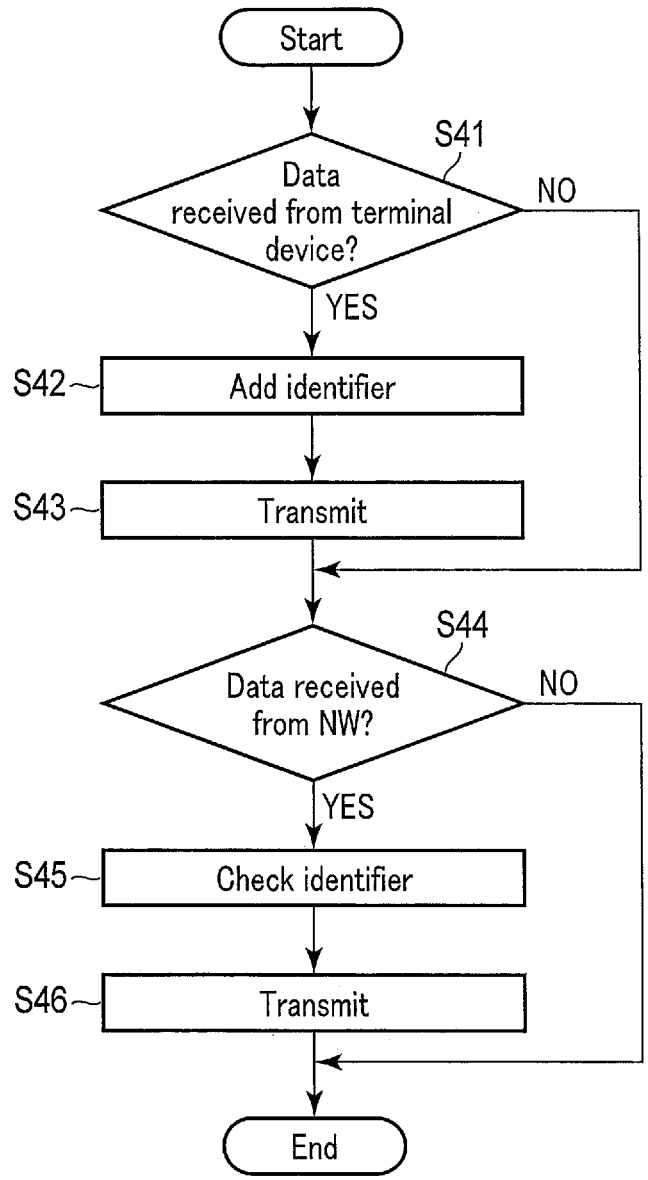
F I G. 6

MESSAGE INDICATING A PASS-THROUGH MODE IN WHICH DATA IS RELAYED BETWEEN A TERMINAL DEVICE AND A NETWORK WITHOUT BEING SUBJECTED TO A CONVERSION PROCESS

CROSS-REFERENCE TO RELATED APPLICATIONS

This application is a Continuation Application of PCT Application No. PCT/JP2019/035961, filed Sep. 12, 2019 and based upon and claiming the benefit of priority from Japanese Patent Application No. 2018-173033, filed Sep. 14, 2018, the entire contents of all of which are incorporated herein by reference.

FIELD

Embodiments described herein relate generally to an information processing apparatus, an information processing system, and an information processing method.

BACKGROUND

In recent years, with the spread of the Internet of Things (IoT), various apparatuses (e.g., an IoT device) have been connected to the Internet. In some information processing systems including such apparatuses, an information processing apparatus is installed between an IoT device and a network to ensure confidentiality of a communication path on the network.

However, conventionally, one issue surrounding the information processing system has been its inability to continue communication between the devices when a problem occurs in the information processing apparatus.

CITATION LIST

Patent Literature

[Patent Literature 1] Jpn. Pat. Appln. KOKAI Publication No. 2009-117887

SUMMARY

In order to solve the above problem, an information processing apparatus, an information processing system, and an information processing method capable of continuing communication even when a problem occurs in the information processing apparatus which relays data.

According to an embodiment, an information processing apparatus comprises a device interface, a network interface, a power supply part, a battery and a control part. A device interface is configured to transmit and receive data to and from a terminal device. A network interface configured to transmit and receive data to and from a network. A power supply part configured to supply electric power from an external power supply. A battery configured to supply electric power when a power supply from the power supply part is stopped. A control part configured to: perform a conversion process on data from the terminal device, and transmit the data to the network; and when the power supply from the power supply part is stopped, transmit, to another information processing apparatus through the network interface, a first message indicating that a pass-through mode in which data is relayed between the terminal device and the network without being subjected to the conversion process is set, and set the pass-through mode.

BRIEF DESCRIPTION OF THE DRAWINGS

FIG. 1 is a block diagram showing a configuration example of an information processing system according to an embodiment.

FIG. 5 is a flowchart showing an operation example of the information processing apparatus according to the embodiment.

FIG. 6 is a flowchart showing an operation example of the information processing apparatus according to the embodiment.

DETAILED DESCRIPTION

Figure 2:
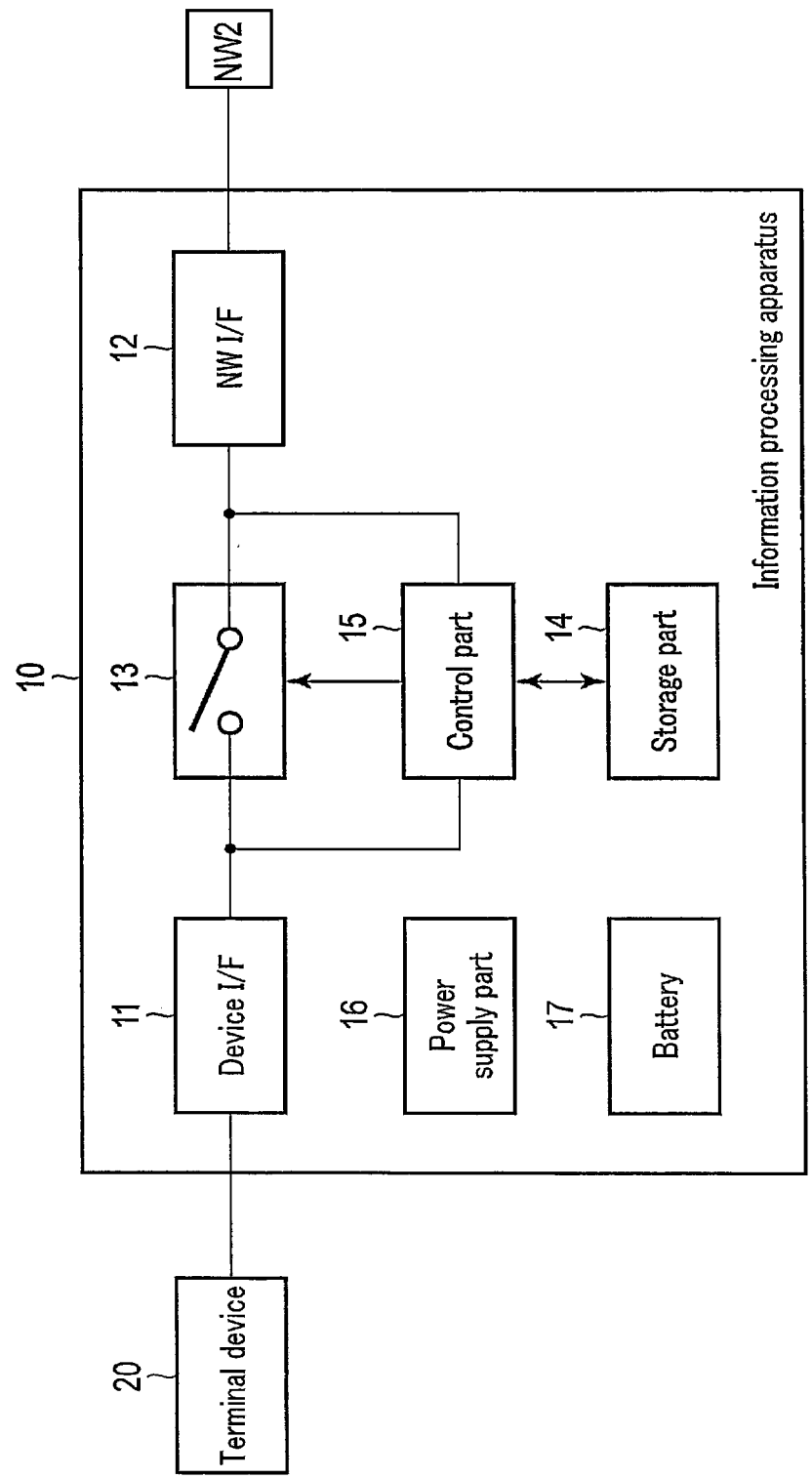
FIG. 2 is a block diagram showing an information processing apparatus according to the embodiment.

Hereinafter, an information processing system according to an embodiment will be described with reference to the drawings.

FIG. 1 is a block diagram showing a configuration example of an information processing system 1 according to the embodiment.

As shown in FIG. 1, the information processing system 1 includes information processing apparatuses 10 (10-1, 10-2, 10-3, . . . ), IoT devices 21 (21-1, 21-2, . . . ), a host device 22, etc.

In the embodiment, all of the information processing apparatuses 10-1, 10-2, and 10-3 have the same configuration, and will be described as "the information processing apparatuses 10" in instances which simply indicate the information processing apparatus included in the information processing system 1 or where no distinction between them need be made.

The IoT devices 21 and the host device 22 are endpoints that are terminal devices connected to a network NW2, and are examples of a terminal device 20.

Each of the information processing apparatuses 10 is connected to the terminal apparatus 20. The information processing apparatuses 10 are connected to the network NW2.

The network NW2 is a communication network for data transmission and reception between the host device 22 and the IoT devices 21. That is, the network NW2 is a communication network that communicably connects the information processing apparatuses 10 to each other. For example, the network NW2 is an information communication network such as the Internet communication network or a local area network (LAN).

The IoT device 21 is a device that transmits and receives data to and from the host device 22 via the network NW2. The IoT device 21 is, for example, various devices connectable to the network NW2 such as an electric appliance, an automobile, a medical device, various sensors, a drone, or a POS terminal. The IoT device 21 may be a desktop PC, a notebook PC, a tablet PC, a smartphone, a wearable terminal, etc.

In the example shown in FIG. 1, the IoT device 21-1 is connected to the network NW2 via the information processing apparatus 10-1. The IoT device 21-2 is connected to the network NW2 via the information processing apparatus 10-3.

The host device 22 controls the IoT devices 21. The host device 22 is, for example, a computer device such as a server device or a personal computer (PC). In the example shown in FIG. 1, the host device 22 is connected to the network NW2 via the information processing apparatus 10-2.

The information processing apparatus 10 (a first information processing apparatus, a second information processing apparatus) is a communication control apparatus connected between the terminal device 20 and the network NW2. The information processing apparatus 10 relays data in communication between the terminal device 20 and the network NW2 while ensuring security. The information processing apparatus 10 encrypts data received from the terminal device 20, and transmits the encrypted data to the network NW2. The information processing apparatus 10 also decrypts data received from the network NW2, and transmits the decrypted data to the terminal device 20.

Next, the information processing apparatus 10 will be described.

FIG. 2 is a block diagram showing a configuration example of the information processing apparatus 10. As shown in FIG. 2, the information processing apparatus 10 includes a device interface 11, a network interface 12, a photo relay switch 13, a storage part 14, a control part 15, a power supply part 16, a battery 17, etc.

The device interface 11 (a first device interface, a second device interface) is an interface for transmitting and receiving data to and from the terminal device 20. The device interface 11 is connected to the terminal device 20 and communicates with the terminal device 20. That is, the device interface 11 outputs data from the control part 15 to the terminal device 20. The device interface 11 also outputs data from the terminal device 20 to the control part 15. For example, the device interface 11 supports a LAN connection.

The network interface 12 (a first network interface, a second network interface) is an interface for transmitting and receiving data to and from the network NW2. The network interface 12 is connected to the network NW2. The network interface 12 communicates with other information processing apparatuses 10 via the network NW. That is, the network interface 12 outputs data from the control part 15 to the network NW2. The network interface 12 also outputs data from the network NW2 to the control part 15. For example, the network interface 12 supports a LAN connection.

The photo relay switch 13 is connected between the device interface 11 and the network interface 12. The photo relay switch 13 connects the device interface 11 and the network interface 12. The photo relay switch 13 is a normally-closed switch. That is, the photo relay switch 13 connects the device interface 11 and the network interface in a state where electric power is not supplied. The photo relay switch 13 disconnects the device interface 11 and the network interface 12 from each other in a state where electric power is supplied.

The photo relay switch 13 includes a photodiode therein. The photo relay switch 13 causes the photodiode to emit light, thereby bringing a communication line between the device interface 11 and the terminal device 20 and a communication line between the network interface 12 and the network NW2 into a conductive state.

The storage part 14 stores various types of data. For example, the storage part 14 functions as a ROM, a RAM, and a NVM. The storage part 14 stores a control program, control data, etc. The control program and the control data are incorporated in advance according to the specification of the information processing apparatus 10. For example, the control program is a program that supports a function realized by the information processing apparatus 10.

Further, the storage part 14 temporarily stores data being processed by the control part 15. The storage part 14 may also store data necessary for execution of an application program, an execution result of an application program, etc.

The control part 15 (a first control part, a second control part) comprehensively controls the information processing apparatus 10. The control part 15 relays communication between the terminal device 20 and the network NW2 by using the device interface 11 and the network interface 12. That is, the control part 15 transmits data received from the terminal device 20 through the device interface 11 to the network NW2 through the network interface 12. Further, the control part 15 transmits data received through the network interface 12 to the terminal device 20 through the device interface 11.

For example, the control part 15 is a processor that executes a control program stored in the storage part 14, etc. The control part 15 may include an application specific integrated circuit (ASIC) or a field-programmable gate array (FPGA).

The power supply part 16 supplies electric power to each part of the information processing apparatus 10 using electric power from an external power supply. For example, the power supply part 16 converts an AC voltage from a commercial power supply into a DC voltage of a predetermined voltage, and supplies the DC voltage to each part.

The battery 17 is a battery that supplies electric power to each part of the information processing apparatus 10. The battery 17 supplies electric power to each part when the power supply part 16 stops supplying electric power. The battery 17 may supply electric power to each part based on control from the control part 15. The battery 17 may also automatically supply electric power to each part when the power supply part 16 stops supplying electric power. For example, the battery 17 is a primary battery or a secondary battery. Further, the battery 17 may be a capacitor, etc.

Figure 3:
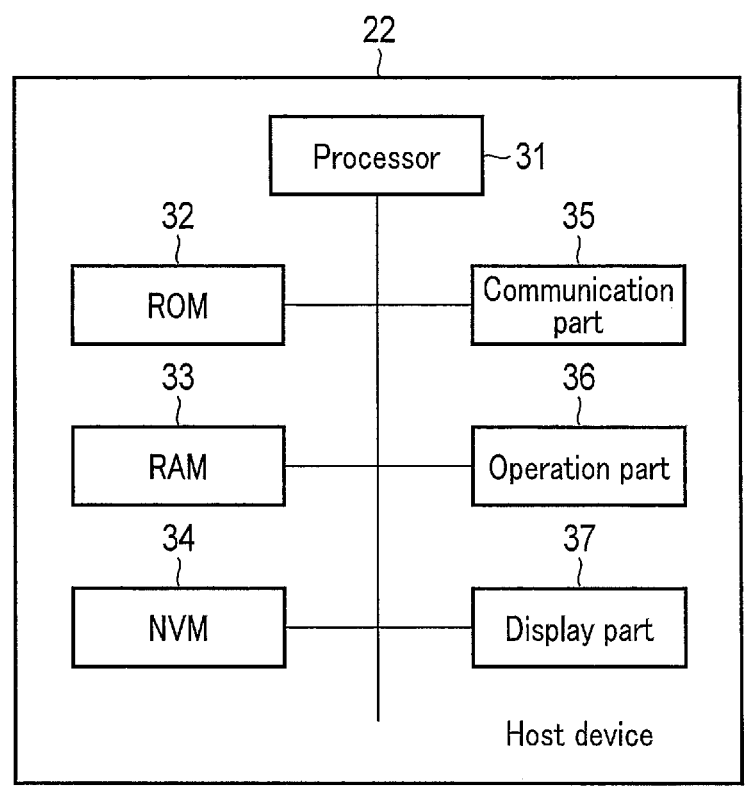
FIG. 3 is a block diagram showing a configuration example of a host device according to the embodiment.

Next, the host device 22 will be described. FIG. 3 is a block diagram showing a configuration example of the host device 22. As shown in FIG. 3, the host device 22 includes a processor 31, a ROM 32, a RAM 33, a NVM 34, a communication part 35, an operation part 36, a display part 37, etc. These parts are connected to one another via a data bus, etc.

The processor 31 has a function of controlling an overall operation of the host device 22. The processor 31 may include an internal cache, various interfaces, etc. The processor 31 realizes various processing by executing programs stored in advance in an internal memory, the ROM 32, or the NVM 34.

Note that some of the various functions realized by the execution of programs by the processor 31 may also be realized by a hardware circuit. In this case, the processor 31 controls a function performed by the hardware circuit.

The ROM 32 is a non-volatile memory in which a control program, control data, etc. are stored in advance. The control program and control data stored in the ROM 32 are incorporated in advance according to the specification of the host device 22. The ROM 32 stores, for example, a program for controlling a circuit board of the host device 22.

The RAM 33 is a volatile memory. The RAM 33 temporarily stores data being processed by the processor 31. The RAM 33 stores various application programs based on instructions from the processor 31. In addition, the RAM 33 may store data necessary for executing the application programs, execution results of the application programs, etc.

The NVM 34 is a non-volatile memory capable of writing and rewriting data. The NVM 34 includes, for example, a hard disk drive (HDD), a solid state drive (SSD), or a flash memory. The NVM 34 stores control programs, applications, various types of data, etc. according to the operational use of the host device 22.

The communication part 35 is an interface for transmitting and receiving data to and from the information processing apparatus 10 (e.g., the information processing apparatus 10-2). The communication part 35 is connected to the information processing apparatus 10. The communication part 35 outputs to the information processing apparatus 10 data transmitted from the host device 22 to the IoT device 21. The communication part 35 also outputs data from the information processing apparatus 10 to the processor 31. For example, the communication part 35 supports a LAN connection.

The operation part 36 receives inputs of various operations from an operator. The operation part 36 transmits a signal indicating a received operation to the processor 31. For example, the operation part 36 includes a keyboard, a ten key, and a touch panel.

The display part 37 displays various types of information based on control of the processor 31. For example, the display part 37 is constituted by a liquid crystal monitor. When the operation part 36 is constituted by a touch panel, etc., the display part 37 may be formed integrally with the operation part 36.

Next, functions realized by the information processing apparatus 10 will be described. The functions realized by the information processing apparatus 10 are realized by the control part 15.

First, the control part 15 has a function of relaying communication between the terminal device 20 and the network NW2.

The control part 15 receives data addressed to a predetermined terminal device 20 from the terminal device through the device interface 11. When the data is received from the terminal device 20, the control part 15 encrypts the received data (a first conversion process, an encryption process). For example, the control part 15 may encrypt the data using a common key shared with another information processing apparatus 10. The control part 15 may also encrypt the data using a public key acquired from another information processing apparatus 10.

When the data is encrypted, the control part 15 transmits the encrypted data to the network NW2 through the network interface 12.

Further, the control part 15 receives encrypted data from another information processing apparatus 10 through the network interface 12. When the encrypted data is received, the control part 15 decrypts the received data (a second conversion process corresponding to the first conversion process). For example, the control part 15 may decrypt the data using a common key shared with another information processing apparatus 10. In addition, the control part 15 may decrypt the data using a secret key.

When the data is decrypted, the control part 15 transmits the decrypted data to the terminal device 20 through the device interface 11.

Further, the control part 15 stores a communication log in the storage part 14. The control part 15 stores, in the storage part 14, for example, a communication date and time, a data amount, a transmission source, a port of the transmission source, a destination, a port of the destination, or various environmental parameters, as the communication log. The configuration of the communication log is not limited to a specific configuration.

In addition, the control part 15 stores a self-diagnosis log in the storage part 14. For example, the control part 15 performs self-diagnosis of an internal element (such as an IC) at the time of activation or at predetermined intervals. When the self-diagnosis is performed, the control part 15 stores a self-diagnosis log indicating the content of the self-diagnosis in the storage part 14.

The control part 15 supplies electric power to the photo relay switch 13 to keep the photo relay switch 13 off.

Further, the control part 15 has a function of determining whether the power supply part 16 supplies electric power.

For example, the power supply part 16 stops the power supply when a power supply from an external power supply is stopped or when a failure occurs in the power supply part 16. The control part 15 may also determine whether the power supply part 16 supplies electric power based on a signal from the power supply part 16. In addition, the control part 15 may determine whether the power supply part 16 supplies electric power based on a voltage output from the power supply part 16. For example, if the voltage output from the power supply part 16 is equal to or higher than a predetermined threshold value, the control part 15 determines that the power supply part 16 supplies electric power. If the voltage output from the power supply part 16 is lower than the predetermined threshold, the control part 15 determines that the power supply part 16 stops supplying electric power.

If it is determined that the power supply by the power supply part 16 is stopped, the control part 15 may transmit an instruction to the battery 17 to supply electric power to each part. In addition, if it is determined that the power supply by the power supply part 16 is stopped, the control part 15 may perform self-diagnosis.

If it is determined that the power supply by the power supply part 16 is stopped, the control part 15 may transmit a communication log and a self-diagnosis log to the host device 22.

In addition, the control part 15 has a function of transmitting, to the host device 22, a message (a third message) indicating that the power supply source is switched from the power supply part 16 to the battery 17 if it is determined that the power supply by the power supply part 16 is stopped.

Here, it is assumed that the information processing apparatus 10 is connected to the IoT device 21.

The control part 15 generates the message indicating that the power supply source is switched from the power supply part 16 to the battery 17. When the message is generated, the control part 15 encrypts the message. When the message is encrypted, the control part 15 transmits the encrypted message to the information processing apparatus 10-2 through the network interface 12.

In addition, the control part 15 has a function of transmitting, to the host device 22, a message (a second message) indicating that an energy saving mode is set when the remaining capacity of the battery 17 becomes equal to or less than a predetermined threshold value (an energy saving transition threshold value, a second threshold value). Here, the energy saving transition threshold value is greater than a pass-through transition threshold value to be described later.

Here, it is assumed that the information processing apparatus 10 is connected to the IoT device 21.

The control part 15 acquires the remaining capacity of the battery 17. The control part 15 may measure a voltage output from the battery 17 to acquire the remaining capacity. The control part 15 may acquire the remaining capacity based on a signal from a sensor for measuring the remaining capacity of the battery 17.

The control part 15 determines whether the remaining capacity of the battery 17 is equal to or less than the energy saving transition threshold value at predetermined intervals. If it is determined that the remaining capacity of the battery 17 is equal to or less than the energy saving transition threshold value, the control part 15 generates a message indicating that the energy saving mode is set.

When the message is generated, the control part 15 encrypts the message. When the message is encrypted, the control part 15 transmits the encrypted message to the information processing apparatus 10-2 through the network interface 12.

If it is determined that the remaining capacity of the battery 17 is equal to or less than the energy saving transition threshold value, the control part 15 may transmit a communication log and a self-diagnosis log to the host device 22.

The energy saving mode will be described later.

Further, the control part 15 has a function of setting the energy saving mode when the remaining capacity of the battery 17 becomes equal to or less than the energy saving transition threshold value.

When the message indicating that the energy saving mode is set is transmitted to the host device 22, the control part 15 sets the energy saving mode.

The energy saving mode is an operation mode for saving electric power consumed by the operation of the information processing apparatus 10.

When the energy saving mode is set, the control part 15 does not perform an encryption process on data from the terminal device 20. Here, the control part 15 adds an identifier to data from the terminal device 20 and transmits the data to the network NW2. For example, the identifier is a value for detecting falsification of data. The control part 15 calculates an identifier based on data from the terminal device 20 and adds the identifier to the data.

In addition, the control part 15 may not perform a decryption process of data from the network NW2. Further, the control part 15 may check the identifier added to the data.

The control part 15 may not store a communication log in the storage part 14. The control part 15 may turn off an LED, etc. incorporated into the housing of the information processing apparatus 10. The operation when the control part 15 sets the energy saving mode is not limited to a specific configuration.

In addition, the control part 15 has a function of transmitting, to the host device 22, a message (a first message) indicating that a pass-through mode is set when the remaining capacity of the battery 17 becomes equal to or less than a predetermined threshold value (a pass-through transition threshold value, a first threshold value) smaller than the energy saving transition threshold value.

Here, it is assumed that the information processing apparatus 10 is connected to the IoT device 21.

The control part 15 acquires the remaining capacity of the battery 17. The control part 15 determines whether the remaining capacity of the battery 17 is equal to or less than the pass-through transition threshold value at predetermined intervals. If it is determined that the remaining capacity of the battery 17 is equal to or less than the pass-through transition threshold value, the control part 15 generates a message indicating that the pass-through mode is set.

When the message is generated, the control part 15 adds an identifier to the message. When the identifier is added to the message, the control part 15 transmits the message to which the identifier is added to the information processing apparatus 10-2 through the network interface 12.

If it is determined that the remaining capacity of the battery 17 is equal to or less than the pass-through transition threshold value, the control part 15 may transmit a communication log and a self-diagnosis log to the host device 22.

The pass-through mode will be described later.

Further, the control part 15 has a function of setting the pass-through mode when the remaining capacity of the battery 17 becomes equal to or less than the pass-through transition threshold value.

When the message indicating that the pass-through mode is set is transmitted to the host device 22, the control part 15 sets the pass-through mode.

The pass-through mode is an operation mode in which the terminal device 20 and the network NW2 are directly connected to each other. That is, the pass-through mode is an operation mode in which data between the network NW2 and the terminal device 20 is relayed without being encrypted or decrypted.

When the pass-through mode is set, the control part 15 stops the power supply to the photo relay switch 13. As a result, the photo relay switch 13 connects the device interface 11 and the network interface 12. That is, the photo relay switch 13 connects the terminal device 20 and the network NW2.

When the power supply to the photo relay switch 13 is stopped, the control part 15 may turn off the power of the information processing apparatus 10.

The control part 15 has a function of transmitting data from the network NW2 to the host device 22 without decrypting the data in accordance with control of the host device 22.

Here, it is assumed that the information processing apparatus 10 is connected to the host device 22.

The control part 15 receives a command indicating that a predetermined information processing apparatus 10 (e.g., the information processing apparatus 10-1) is operating in the energy saving mode from the host device 22. That is, the control part 15 receives a command instructing non-decryption of data received from the information processing apparatus 10. When the command is received, the control part 15 checks an identifier of the data without decrypting the data from the predetermined information processing apparatus 10.

When the identifier of the data is checked, the control part 15 transmits the data to the host device 22 through the device interface 11. When the identifier does not match, the control part 15 may transmit information indicating that the identifier does not match to the host device 22.

In addition, the control part 15 receives a command indicating that a predetermined information processing apparatus 10 (e.g., the information processing apparatus 10-3) is operating in the pass-through mode from the host device 22. That is, the control part 15 receives a command instructing non-decryption of data received from the information processing apparatus 10. When the command is received, the control part 15 transmits the data from the predetermined information processing apparatus 10 to the host device 22 through the device interface 11 without decrypting the data.

Next, functions realized by the host device 22 will be described. The functions realized by the host device 22 are realized by the processor 31 executing programs stored in the ROM 32, NVM 34, etc.

First, the processor 31 has a function of outputting a warning when receiving a message indicating that the power supply source is switched from the power supply part 16 to the battery 17.

For example, the processor 31 receives a message indicating that the power supply source is switched from the power supply part 16 to the battery 17 from a predetermined information processing apparatus 10 through the communication part 35. When the message is received, the processor 31 displays, on the display part 37, a warning indicating that the predetermined information processing apparatus 10 is operating by the battery 17, etc.

The processor 31 has a function of outputting a warning when receiving a message indicating that the energy saving mode is set.

For example, the processor 31 receives a message indicating that the energy saving mode is set from the information processing apparatus 10 through the communication part 35. When the message is received, the processor 31 displays, on the display part 37, a warning indicating that the information processing apparatus 10 is operating in the energy saving mode, etc.

In addition, the processor 31 has a function of transmitting a command, indicating that the information processing apparatus 10 transmitting the message is operating in the energy saving mode, to an information processing apparatus 10 connected to the processor 31 when the message indicating that the energy saving mode is set is received.

Here, it is assumed that the processor 31 receives the message from the information processing apparatus 10 (e.g., the information processing apparatus 10-1) connected to the IoT device 21. When the message is received, the processor transmits a command indicating that the information processing apparatus 10 is operating in the energy saving mode to the information processing apparatus 10-2 through the communication part 35. That is, the control part 15 transmits, to the information processing apparatus 10-2, a command instructing non-decryption of data received from the information processing apparatus 10.

In addition, the processor 31 has a function of outputting a warning when receiving a message indicating that the pass-through mode is set.

For example, the processor 31 receives the message indicating that the pass-through mode is set from the information processing apparatus 10 through the communication part 35. When the message is received, the processor 31 displays, on the display part 37, a warning indicating that the information processing apparatus 10 is operating in the pass-through mode, etc.

In addition, the processor 31 has a function of transmitting a command, indicating that the information processing apparatus 10 transmitting the message is operating in the pass-through mode, to an information processing apparatus 10 connected to the processor 31 when the message indicating that the pass-through mode is set is received.

Here, it is assumed that the processor 31 receives the message from the information processing apparatus 10 (e.g., the information processing apparatus 10-1) connected to the IoT device 21. When the message is received, the processor transmits a command, indicating that the information processing apparatus 10 is operating in the pass-through mode, to the information processing apparatus 10-2 through the communication part 35. That is, the control part 15 transmits, to the information processing apparatus 10-2, a command instructing non-decryption of data received from the information processing apparatus 10.

Next, an operation example of the information processing apparatus 10 will be described. Here, an operation example in which the information processing apparatus 10 changes an operation mode will be described.

Figure 4:
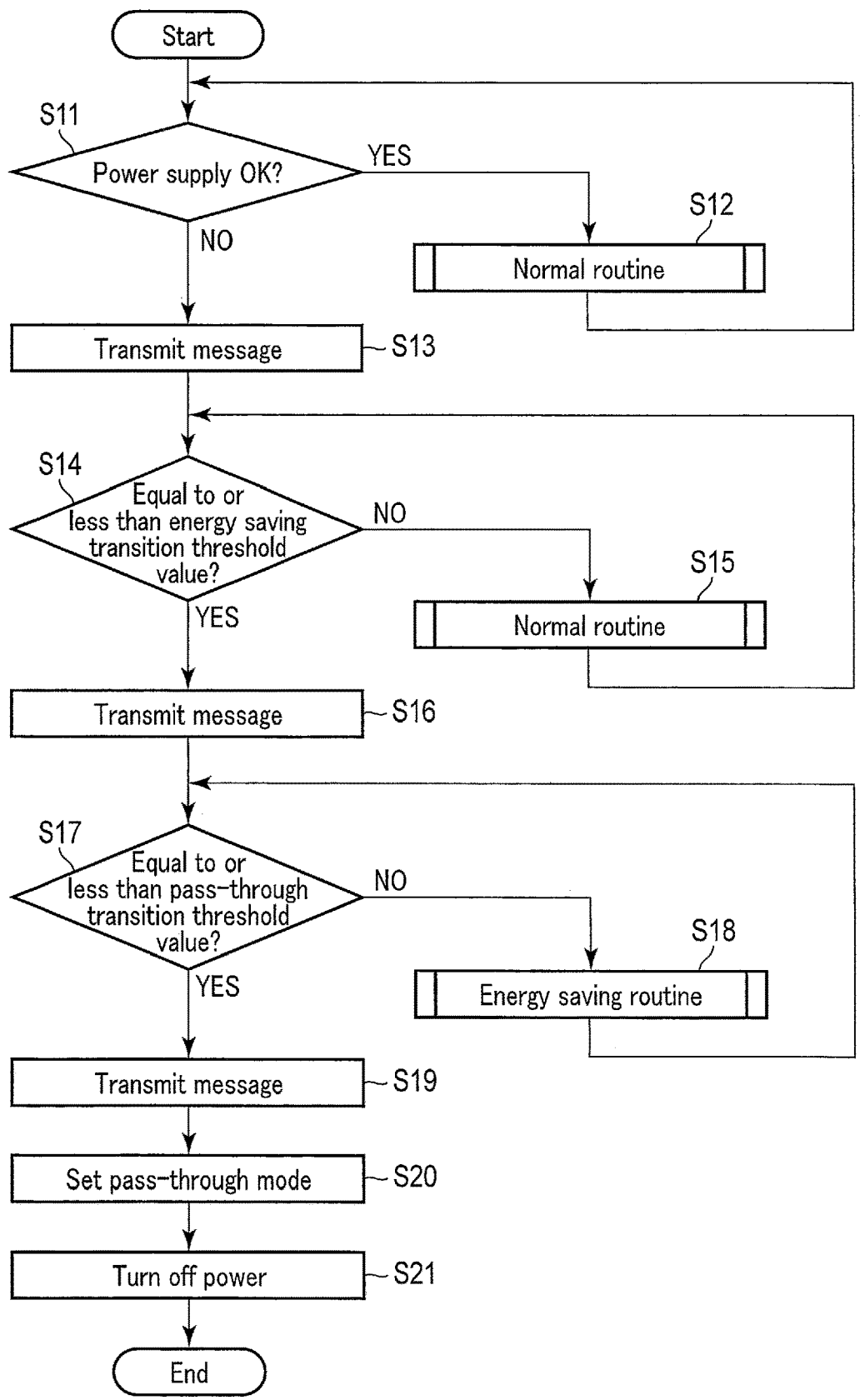
FIG. 4 is a flowchart showing an operation example of the information processing apparatus according to the embodiment.

FIG. 4 is a flowchart for explaining an operation example in which the information processing apparatus 10 changes an operation mode.

First, the control part 15 of the information processing apparatus 10 determines whether the power supply part 16 supplies electric power (S11). If it is determined that the power supply part 16 supplies electric power (S11, YES), the control part 15 executes a normal routine (S12). When the normal routine is executed, the control part 15 returns to S11.

If it is determined that the power supply part 16 stops supplying electric power (S11, NO), the control part 15 transmits, to the host device 22, a message indicating that the power supply source is switched from the power supply part 16 to the battery 17 (S13). Here, the battery 17 supplies electric power to each part.

When the message indicating the switching of the power supply source from the power supply part 16 to the battery 17 is transmitted, the control part 15 determines whether the remaining capacity of the battery 17 is equal to or less than an energy saving transition threshold value (S14). If it is determined that the remaining capacity of the battery 17 exceeds the energy saving transition threshold value (S14, NO), the control part 15 executes a normal routine (S15). When the normal routine is executed, the control part 15 returns to S14.

If it is determined that the remaining capacity of the battery 17 is equal to or less than the energy saving transition threshold value (S14, YES), the control part 15 transmits, to the host device 22, a message indicating that an energy saving mode is set (S16).

When the message indicating that the energy saving mode is set is transmitted, the control part 15 determines whether the remaining capacity of the battery 17 is equal to or less than a pass-through transition threshold value (S17). If it is determined that the remaining capacity of the battery 17 exceeds the pass-through transition threshold value (S17, NO), the control part 15 executes an energy saving routine (S18). When the energy saving routine is executed, the control part 15 returns to S17.

If it is determined that the remaining capacity of the battery 17 is equal to or less than the pass-through transition threshold value (S17, YES), the control part 15 transmits, to the host device 22, a message indicating that a pass-through mode is set (S19).

When the message indicating that the pass-through mode is set is transmitted, the control part 15 sets the pass-through mode (S20). When the pass-through mode is set, the control part 15 turns off its own power (S21). When its own power is turned off, the control part 15 ends the operation.

Next, an operation example in which the control part executes the normal routines (S12 and S15) will be described. FIG. 5 is a flowchart for explaining an operation example in which the control part 15 executes the normal routines (S12 and S15).

First, the control part 15 determines whether data is received from the terminal device 20 through the device interface 11 (S31). If it is determined that the data is received from the terminal device 20 (S31, YES), the control part 15 encrypts the data (S32). When the data is encrypted, the control part 15 transmits the encrypted data to the network NW2 through the network interface 12 (S33).

When the encrypted data is transmitted to the network NW2, the control part 15 stores a communication log in the storage part 14 (S34).

If it is determined that the data is not received from the terminal device 20 (S31, NO) or if the communication log is stored in the storage part 14 (S34), the control part 15 determines whether data is received from the network NW2 through the network interface 12 (S35). If it is determined that the data is received from the network NW2 (S35, YES), the control part 15 decrypts the data (S36). When the data is decrypted, the control part 15 transmits the decrypted data to the terminal device 20 through the device interface 11 (S37).

When the decrypted data is transmitted to the terminal device 20, the control part 15 stores a communication log in the storage part 14 (S38). If it is determined that the data is not received from the network NW2 (S35, NO) or if the communication log is stored in the storage part 14 (S38), the control part 15 ends the operation.

Next, an operation example in which the control part executes the energy saving routine (S18) will be described. FIG. 6 is a flowchart for explaining an operation example in which the control part 15 executes the energy saving routine (S18).

First, the control part 15 determines whether data is received from the terminal device 20 through the device interface 11 (S41). If it is determined that the data is received from the terminal device 20 (S41, YES), the control part 15 adds an identifier to the data (S42). When the identifier is added to the data, the control part 15 transmits the data to which the identifier is added to the network NW2 through the network interface 12 (S43).

If it is determined that the data is not received from the terminal device 20 (S41, NO) or if the data to which the identifier is added is transmitted to the network NW2 (S43), the control part 15 determines whether data is received from the network NW2 through the network interface (S44).

If it is determined that the data is received from the network NW2 (S44, YES), the control part 15 checks an identifier of the data (S45). When the identifier of the data is checked, the control part 15 transmits the data to the terminal device 20 through the device interface 11 (S46).

If it is determined that the data is not received from the network NW2 (S44, NO) or if the data is transmitted to the terminal device 20 (S46), the control part 15 ends the operation.

When there is a mismatch in the identifier in S45, the control part 15 may transmit information indicating such a mismatch in the data to the terminal device 20. In addition, when there is a mismatch in the identifier in S45, the control part 15 need not transmit the data to the terminal device 20.

Figure 7:
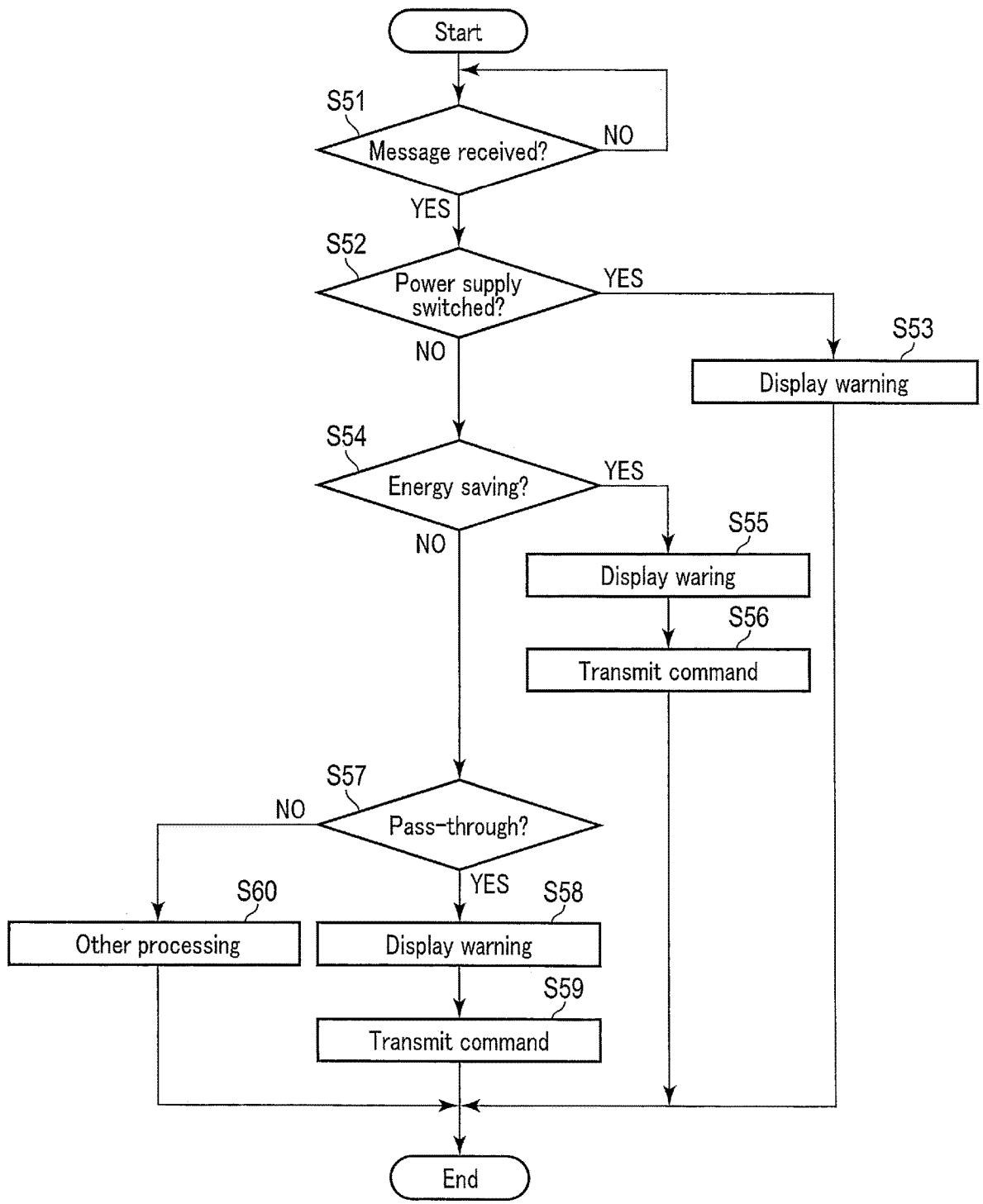
FIG. 7 is a flowchart showing an operation example of the host device according to the embodiment.

Next, an operation example of the host device 22 will be described. FIG. 7 is a flowchart for explaining an operation example of the host device 22.

First, the processor 31 of the host device 22 determines whether a message is received from the information processing apparatus 10 connected to the IoT device 21 through the communication part 35 (S51). If it is determined that the message is not received from the information processing apparatus 10 (S51, NO), the processor 31 returns to S51.

If it is determined that the message is received from the information processing apparatus 10 (S51, YES), the processor 31 determines whether the received message is a message indicating that the power supply source is switched from the power supply part 16 to the battery 17 (S52).

If it is determined that the received message is a message indicating that the power supply source is switched from the power supply part 16 to the battery 17 (S52, YES), the processor 31 displays a warning indicating that the information processing apparatus 10 that is the transmission source of the message is operating by the battery 17 on the display part 37 (S53).

If it is determined that the received message is not a message indicating that the power supply source is switched from the power supply part 16 to the battery 17 (S52, NO), the processor 31 determines whether the received message is a message indicating that an energy saving mode is set (S54).

If it is determined that the received message is a message indicating that the energy saving mode is set (S54, YES), the processor 31 displays a warning indicating that the information processing apparatus 10 that is the transmission source of the message is operating in the energy saving mode on the display part 37 (S55).

When the warning is displayed, the processor 31 transmits, to an information processing apparatus 10 (the information processing apparatus 10-2) connected to the processor 31, a command indicating that the information processing apparatus 10 that is the transmission source of the message is operating in the energy saving mode (S56).

If it is determined that the received message is not a message indicating that the energy saving mode is set (S54, NO), the processor 31 determines whether the received message is a message indicating that a pass-through mode is set (S57).

If it is determined that the received message is a message indicating that the pass-through mode is set (S57, YES), the processor 31 displays a warning indicating that the information processing apparatus 10 that is the transmission source of the message is operating in the pass-through mode on the display part 37 (S58).

When the warning is displayed, the processor 31 transmits, to the information processing apparatus 10 (the information processing apparatus 10-2) connected to the processor 31, a command indicating that the information processing apparatus 10 that is the transmission source of the message is operating in the pass-through mode (S59).

If it is determined that the received message is not a message indicating that the pass-through mode is set (S57, NO), the processor 31 performs other processing according to the message (S60).

When the warning is displayed (S53), when the command is transmitted (S56), when the command is transmitted (S59), or when other processing is performed (S60), the processor 31 ends the operation.

The control part 15 of the information processing apparatus 10 may sequentially or simultaneously perform the operations of transmitting the message indicating that the pass-through mode is set and setting the pass-through mode. In addition, the control part 15 of the information processing apparatus 10 may transmit the message indicating that the pass-through mode is set after setting the pass-through mode.

Further, the control part 15 of the information processing apparatus 10 may sequentially or simultaneously perform the operations of transmitting the message indicating that the energy saving mode is set and the setting the energy saving mode. The control part 15 of the information processing apparatus 10 may transmit the message indicating that the energy saving mode is set after setting the energy saving mode.

The control part 15 of the information processing apparatus 10 may set the energy saving mode at the time when the power supply from the power supply part 16 is stopped. In this case, the control part 15 transmits, to the host device 22, the message indicating that the energy saving mode is set at the time when the power supply from the power supply part 16 is stopped.

Further, the control part 15 of the information processing apparatus 10 may set the pass-through mode at the time when the power supply from the power supply part 16 is stopped. In this case, the control part 15 transmits, to the host device 22, the message indicating that the pass-through mode is set at the time when the power supply from the power supply part 16 is stopped.

The control part 15 of the information processing apparatus 10 may transmit the message indicating that the energy saving mode is set to another information processing apparatus 10. When the message is received, the control part 15 of said another information processing apparatus 10 transmits data from the information processing apparatus 10 that is the transmission source of the message to the terminal device 20 without decrypting the data (e.g., by removing the identifier).

The control part 15 of the information processing apparatus 10 may transmit the message indicating that the pass-through mode is set to another information processing apparatus 10. When the message is received, the control part 15 of said another information processing apparatus 10 transmits data from the information processing apparatus 10 that is the transmission source of the message to the terminal device 20 without decrypting the data.

The control part 15 of the information processing apparatus 10 may not encrypt data from the terminal device 20. For example, the control part 15 may compress the data, and transmit it to the network NW2. In this case, the control part 15 decompresses data from the network NW2 and transmits the decompressed data to the terminal device 20.

The information processing apparatus formed as described above notifies the host device that the energy saving mode or the pass-through mode is set when electric power cannot be supplied to each part by external power. As a result, the host device instructs an information processing apparatus connected thereto to relay data from the information processing apparatus operating in the energy saving mode or the pass-through mode without decrypting the data. Thus, the host device can appropriately acquire the data from the information processing apparatus operating in the energy saving mode or the pass-through mode. Therefore, the information processing system can continue communication between the terminal devices even when a trouble occurs in the information processing apparatus.

While some embodiments of the present invention have been described, these embodiments have been presented by way of example only and are not intended to limit the scope of the invention. These novel embodiments described herein may be embodied in a variety of other forms, and various omissions, substitutions, and changes can be made without departing from the spirit of the invention. These embodiments and modifications thereof are included in the scope and spirit of the invention and are included in the scope of the claimed inventions and their equivalents.

The invention claimed is:

1. An information processing apparatus comprising:
a device interface configured to transmit and receive data to and from a terminal device;
a network interface configured to transmit and receive data to and from a network;
a power supply part configured to supply electric power from an external power supply;
a battery configured to supply electric power when a power supply from the power supply part is stopped; and
a control part configured to:
perform a conversion process on data from the terminal device, and transmit the data to the network; and
when the power supply from the power supply part is stopped, transmit, to another information processing apparatus through the network interface, a first message indicating that a pass-through mode in which data is relayed between the terminal device and the network without being subjected to the conversion process is set, and set the pass-through mode.

2. The information processing apparatus according to claim 1, wherein the conversion process is an encryption process.

3. The information processing apparatus according to claim 1, wherein the control part is configured to transmit the first message, and set the pass-through mode, when a remaining capacity of the battery is equal to or less than a first threshold value.

4. The information processing apparatus according to claim 3, wherein the control part is configured to transmit, to the another information processing apparatus, a second message indicating that an energy saving mode in which an identifier is added to data from the terminal device is set, and set the energy saving mode, when the remaining capacity of the battery is equal to or less than a second threshold value greater than the first threshold value.

5. The information processing apparatus according to claim 1, wherein the control part is configured to transmit the first message to a terminal device connected to the another information processing apparatus through the network interface and the another information processing apparatus.

6. The information processing apparatus according to claim 1, wherein
the control part is configured to transmit, to the another information processing apparatus through the network interface, a third message indicating that a power supply source is switched from the power supply part to the battery when the power supply from the power supply part is stopped.

7. The information processing apparatus according to claim 1, wherein the control part is configured to transmit a communication log to the another information processing apparatus through the network interface when the power supply from the power supply part is stopped.

8. The information processing apparatus according to claim 1, wherein the control part is configured to transmit a self-diagnosis log to the another information processing apparatus through the network interface when the power supply from the power supply part is stopped.

9. An information processing system comprising a host device, a first information processing apparatus, and a second information processing apparatus, wherein the first information processing apparatus comprises:
a first device interface configured to transmit and receive data to and from a terminal device;

a first network interface configured to transmit and receive data to and from a network;

a power supply part configured to supply electric power from an external power supply;

a battery configured to supply electric power when a power supply from the power supply part is stopped; and a first control part configured to:
  perform a first conversion process on data from the terminal device, and transmit the data to the network; and
  when the power supply from the power supply part is stopped, transmit, to the host device through the first network interface, a first message indicating that a pass-through mode in which data is relayed between the terminal device and the network without being subjected to the first conversion process is set, and set the pass-through mode, wherein the second information processing apparatus comprises:
  a second device interface configured to transmit and receive data to and from the host device;
  a second network interface configured to transmit and receive data to and from the terminal device through the network; and
  a second control part configured to:
    perform a second conversion process corresponding to the first conversion process on data from the first information processing apparatus, and transmit the data to the host device; and
    when a command indicating that the first information processing apparatus is operating in the pass-through mode, transmit the data from the first information processing apparatus to the host device without performing the second conversion process, and wherein the host device includes:
  a communication part configured to transmit and receive data to and from the second information processing apparatus; and
  a processor configured to transmit the command to the second information processing apparatus through the communication part when the first message is received through the communication part.

10. An information processing method executed by a control part, the method comprising:
  performing a conversion process on data from a terminal device, and transmitting the data to a network; and
  when a power supply from a power supply part configured to supply electric power from an external power supply is stopped, transmitting, to another information processing apparatus, a first message indicating that a pass-through mode in which data is relayed between the terminal device and the network without being subjected to the conversion process is set, and setting the pass-through mode.

\* \* \* \* \*